(12) United States Patent
Zhou et al.

(10) Patent No.: US 9,633,410 B2
(45) Date of Patent: Apr. 25, 2017

(54) COMPOSITOR SUPPORT FOR GRAPHICS FUNCTIONS (71) Applicant: INTEL CORPORATION, Santa Clara, CA (US)

(72) Inventors: Yunlong Zhou, Shanghai (CN); Qing Jian Song, Shanghai (CN); Jianjun Ye, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,480

(22) PCT Filed: Mar. 14, 2013

(86) PCT No.: PCT/CN2013/072610
§ 371 (c)(1),
(2) Date: Jun. 18, 2013

(87) PCT Pub. No.: WO2014/139122
PCT Pub. Date: Sep. 18, 2014

(65) Prior Publication Data
US 2015/0310579 A1 Oct. 29, 2015

(51) Int. Cl.
G06T 13/00 (2011.01)
G06T 1/60 (2006.01)
(Continued)

(52) U.S. Cl.
CPC .......... *G06T 1/60* (2013.01); *G06T 1/20* (2013.01); *G06T 13/00* (2013.01); *G06T 15/005* (2013.01); *G06T 15/503* (2013.01)

(58) Field of Classification Search
CPC ....... G06T 13/40; G06T 15/005; G06T 19/00; G06T 11/40; G06T 1/20; G06F 3/14; G09G 5/363; H04N 7/173; H04N 7/17318
(Continued)

(56) References Cited

U.S. PATENT DOCUMENTS 8,913,067 B1 * 12/2014 Kokkevis .............. G06F 9/4443 345/522
2005/0285867 A1 12/2005 Brunner et al.
(Continued)

FOREIGN PATENT DOCUMENTS

CN 1980321 A 6/2007
EP 2 053 559 A1 A1 4/2009

OTHER PUBLICATIONS

Kokkevis, "GPU Accelerated Compositing in Chrome", The Chromium Projects, May 2012 (available at: http://blog.csdn.net/flyingqr/article/details/8135339) (last visited: Aug. 25, 2015) (pp. 1-8).*
(Continued)

*Primary Examiner* — Xiao Wu
*Assistant Examiner* — Sarah Lhymn
(74) *Attorney, Agent, or Firm* — Schwabe, Williamson & Wyatt, P.C.

(57) ABSTRACT

Apparatuses, methods and storage medium associated with operating a graphics application are disclosed herein. In embodiments, an apparatus may include a general purpose processor, a graphics processor, and memory configured to hold a graphics commands buffer and a compositor command buffer. The apparatus may further include a compositor configured to: insert a plurality of viewport commands associated with a plurality of graphics functions into the compositor command buffer, and copy a plurality of graph-
(Continued)

ics commands of the graphics functions, from the graphics command buffer to the compositor command buffer. The graphics functions may be associated with a graphics application, and share a common context with the compositor. Other embodiments may be described and claimed.

14 Claims, 5 Drawing Sheets (51) Int. Cl.
G06T 15/00 (2011.01)
G06T 15/50 (2011.01)
G06T 1/20 (2006.01)

(58) Field of Classification Search
USPC ....... 345/204, 418, 419, 441, 467, 473, 501, 345/502, 503, 505, 506, 520, 522, 530, 345/531, 532, 541, 619; 725/105, 116, 725/131, 132, 133, 134
See application file for complete search history.

(56) References Cited

U.S. PATENT DOCUMENTS

| 2009/0033672 A1 | 2/2009 | Jiao et al. |
| 2009/0225093 A1 | 9/2009 | Harper et al. |
| 2010/0039562 A1* | 2/2010 | Yang .................. G06F 3/1423 348/655 |
| 2011/0314412 A1 | 12/2011 | Aldinger et al. |

OTHER PUBLICATIONS

"Improving the Performance of your HTML5 App", Malte Ubl, Feb. 14, 2011, available at: http://www.html5rocks.com/en/tutorials/speed/html5/ (last visited Aug. 27, 2015) (pp. 1-19).*
Final Cut Pro 7 User Manual (2010), Apple, Inc., Chapter 71: Compositing and Layering, pp. 1209-1238.*
International Search Report and Written Opinion mailed Dec. 19, 2013 for International Application No. PCT/CN2013/072610, 10 pages.
International Preliminary Report on Patentability mailed Sep. 24, 2015 for International Application No. PCT/CN2013/072610, 6 pages.
Office Action mailed Oct. 25, 2016 for Russian Patent Application No. 2015134182, 13 pages.
Kokkevis et al., "GPU Accelerated Compositing in Chrome,The Chromium Projects", [online] May 2012 [Retrieved Nov. 28, 2016], Retrieved from http://flaminghorns.com/chromium_graphics/GPU%20Accelerated%20Compositing%20in%20Chrome%20-%20The%20Chromium%20Projects.pdf, 8 pages.
Malte Ubi, "Improving the Performance of your HTML5 App", [online] May 14, 2011[Retrieved Nov. 28, 2016], Retrieved from https://www.html5rocks.com/en/tutorials/speed/html5/, 21 pages.

* cited by examiner

COMPOSITOR SUPPORT FOR GRAPHICS FUNCTIONS

CROSS REFERENCE TO RELATED APPLICATIONS

The present application is a national phase entry under 35 U.S.C. §371 of International Application No. PCT/CN2013/072610, filed Mar. 14, 2013, entitled "COMPOSITOR SUPPORT FOR GRAPHICS FUNCTIONS", which designated, among the various States, the United States of America. The Specification of the PCT/CN2013/072610 Application is hereby incorporated by reference.

TECHNICAL FIELD

The present disclosure relates to the field of data processing, in particular, to apparatuses, methods and storage medium associated with supporting web applications with rich media.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in general purpose microprocessors, graphics processors, networking, and related technologies have led to an increase in availability of multi-media contents via the Internet. Increasingly, web based applications include rich and sophisticated interactive 2D/3D graphics and/or animations. Development and availability of highly capable graphics libraries, such as WebGL (Web Graphics Library), have further accelerated the availability of these rich graphics web based applications.

While there have been significant advances in graphic processors, due in part in the proliferation of hardware platforms, some graphics processors in certain hardware platforms still struggle to keep up with the processing needs of the rich graphics web based applications. The problem is further compounded when the graphics processors have to support 1080p rendering, and the increased processing demands of many HTML5 elements used in the emerging rich graphics web based applications. (HTML=Hypertext Markup Language.)

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with supporting graphics applications, such as web applications with rich media, are disclosed. In embodiments, an apparatus, e.g., a set-top box, may include a general purpose processor, a graphics processor, and memory. The memory may be configured to hold a graphics commands buffer and a compositor command buffer. The graphics commands buffer may be associated with a plurality of graphics functions, and the compositor command buffer may be associated with a compositor. The graphics functions may be associated with a graphics application, e.g., WebGL functions associated with a web application with rich media, and configured to store their graphics commands into the graphics command buffer. The compositor may be associated with a browser, e.g., a browser with support for HTML5. The compositor may be configured to: insert a plurality of viewport commands associated with the graphics functions into the compositor command buffer, and copy a plurality of graphics commands of the graphics functions, from the graphics command buffer to the compositor command buffer. The graphics functions and the compositor may share a common execution context. In embodiments, the graphics function may be loaded into the execution context of the compositor, e.g., by the compositor.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality. The term "closed captions" is to include traditional closed captions and/or subtitles.

Figure 1:
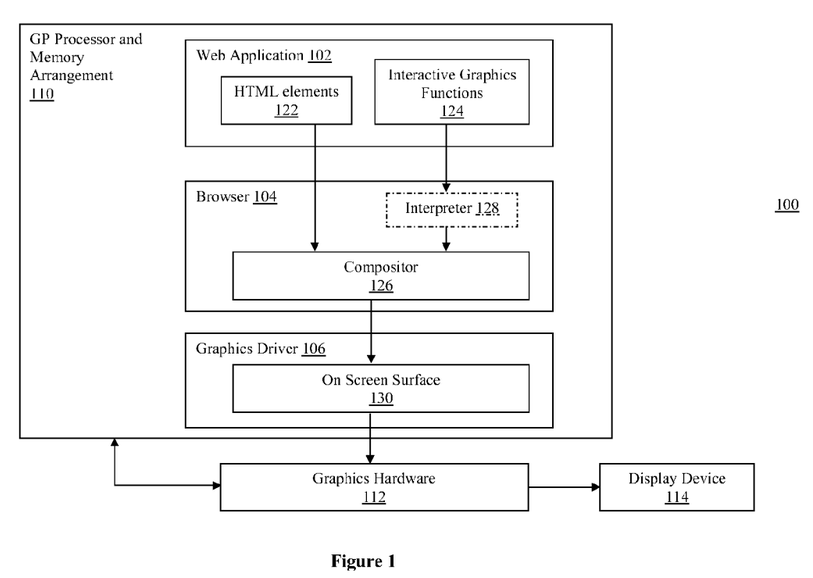
FIG. 1 illustrates a component view of a computing device incorporated with the teachings of the present disclosure to support web applications with rich media, in accordance with various embodiments.

Referring now FIG. 1, a component view of a computing device incorporated with the teachings of the present disclosure to support web applications with rich media, in accordance with various embodiments, is shown. As illustrated, in embodiments, computing device 100 may include general purpose (GP) processor and memory arrangement 110, graphics hardware 112, and display device 114, coupled with each other as shown. GP processor and memory arrangement 110 may be configured to host and execute web application 102 and browser 104, with the assistance of graphics hardware 112, via graphics driver 106.

Web application 102 is intended to be a broad range of web applications known in the art, including without limitation, mobile applications. In embodiments, web application 102 may be constructed with HTML elements 122, e.g., HTML5 elements. Further, web application 102 may provide at least some of the rich media using interactive graphics functions 124, such as graphics functions of WebGL, hereinafter, simply "graphics functions." Similarly, except for the teachings of the present discloser, browser 104 is intended to be a broad range of browsers known in the art, including without limitation, browsers designed for mobile computing devices. In embodiments, browser 104 may include compositor 126, and optionally, interpreter 128, such as Javascript®, to support the operation of web application 102. In particular, interpreter 128 may be configured with support for the interpretive language employed to implement graphics functions 124. Compositor 126 may be configured to compose on screen displays, as commanded by HTML elements 122 and graphics functions 124 in on screen surface 130. Graphics driver 106 may be configured to in turn operate graphics hardware 110 to render on screen surface 130 on display device 114.

Typically, in prior art devices, the graphics functions and the compositor would operate in their separate and respective contexts. The graphics functions would first draw the graphics content to an off screen surface. Then, the compositor would re-draw the graphics content a second time, based on the off screen surface, with alpha blending, and incorporate the graphics content into the on screen surface. Experience has shown that performance of the prior art approach is less than desirable on a number of hardware platform, for operating rich media web applications, e.g., operating web applications with full 1080p rendering on a hardware platform with POWER VR SGX545 type graphics processor, using Window CE for operating system and Chromium for browser. POWER VR SGX545 is available from Imagination Technologies of United Kingdom. Window CE and Chromium are available from Microsoft of Redmond, Wash., and Google of Menlo Park, Calif., respectively.

However, as will be described in more detail below, in embodiments, unlike the prior art, graphics function 124 would operate in the context of compositor 126 instead. In other words, in embodiments, graphics functions 124 and context of compositor 126 share the same common context. Further, graphics functions 124 instead of drawing the graphics onto an off screen surface would insert their graphics commands into a graphics command buffer. After having the appropriate viewport commands of graphics functions 124 written into the compositor's graphics commands buffer, compositor 126 would copy the graphics commands of graphics functions 124 into the compositor's graphics commands buffer directly, thereby enhancing performance.

Before further describing the teachings of the present disclosure, it should be noted that while for ease of understanding, much of the remaining descriptions will be presented in terms of web application 102, WebGL graphics functions, the present disclosure is not so limited. The present disclosure may be practiced with other graphics applications and/or other graphics functions of other graphics libraries. For example, in alternate embodiments, graphics functions 124 may be fully compiled object code that does not require the support of interpreter 128.

GP processor and memory arrangement 110 is intended to represent a broad range of GP processors and memory devices, including without limitations, arrangements designed for mobile computing. For examples, without limitations, GP processor may be any one of a number of single or multi-core processors known in the art. One or more processors may be used. Memory may be any one of a number of volatile and/or non-volatile memory known in the art including, but are not limited to, dynamic random access memory (DRAM), FLASH, and so forth. Similarly, one or more memory units may be used. Graphics hardware 112 may be any one of a wide range of graphics processors known in the art, including without limitations, those designed for mobile computing. In general, by virtue of the enhanced performance provided by the present disclosure, lower performance graphics processor may be employed (as compared to what is needed to support certain rich graphics applications under the prior art). Display device 114 may be any one of a number of display devices known in the art including, but are not limited to, touch screen displays.

Further, computing device 100 may include other components, such as wired or wireless communication interfaces. An example of wired communication interfaces may include an Ethernet networking interface. Examples of wireless communication interfaces may include interfaces that support WiFi, 3G/4G wireless communications. Computing device 100 may also include mass storage devices, such as magnetic, optical and/or solid state mass storages, and/or input devices, such as keyboard or other cursor control and/or gesture recognition devices. Still further, computing device 100 may include camera, Global Position System (GPS) support, and various sensors. In other words, except for the incorporation of the teachings of the present disclosure, computing device 100 may be any one of a number of stationary or mobile "computing" devices known in art including, without limitation, set-top boxes, smartphones, tablets, ultrabooks, e-readers, laptop computers, desktop computers, and so forth.

Figure 2:
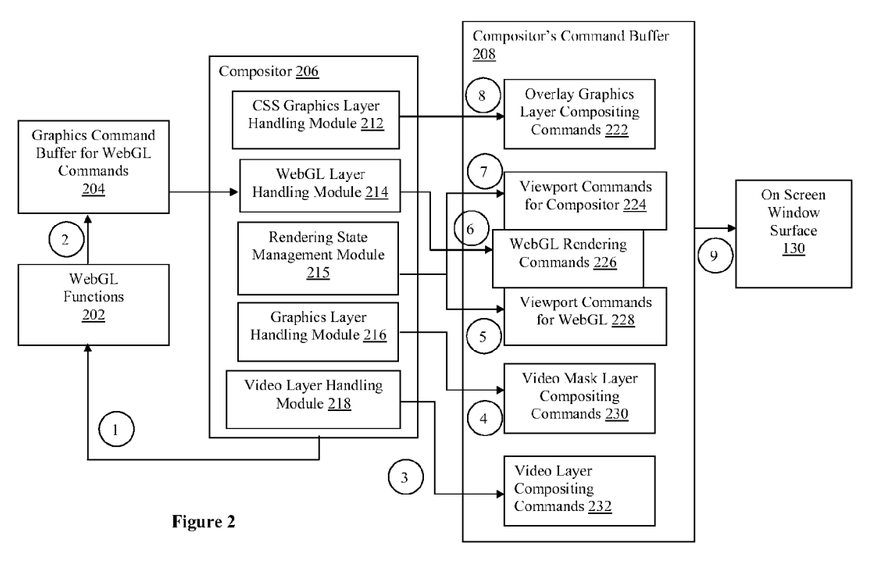
FIG. 2 illustrates the interactions between the graphics functions of the web application and the compositor of FIG. 1 in further detail, in accordance with various embodiments.

Referring now to FIG. 2, which illustrates the interactions between the graphics functions and the compositor of FIG. 1 in further detail, in accordance with various embodiments. For the embodiments, the graphics functions may be WebGL functions 202, whereas the compositor may be embodiment 206 with a cascade style sheet (css) graphics layer handling module 212, WebGL layer handling module 214, rendering state management module 215, graphics layer handling module 216, and video layer handling module 218. WebGL functions 202 may be associated with graphics command buffer 204, while compositor 206 may be associated with compositor command buffer 208.

In embodiments, CSS graphics layer handling module 212 may be configured to write overlay graphics layer compositing commands 222 into compositor command buffer 208 to blend overlay layer onto on screen surface 130. WebGL layer handling module 214 may be configured write the WebGL rendering commands 226 into compositor command buffer 208 to blend WebGL layer onto on screen surface 130. Rendering state management module 215 may be configured to manage rendering states associated with rendering graphics onto on screen surface 130. In particular, rendering state management module 215 may be configured to write viewport command of the WebGL functions and the compositor into compositor command buffer 208 to control blending by the WebGL functions and the compositor. In embodiments, rendering state management module 215 may also be configured to save and restore commands for alpha blending, depth-test, scissor test stencil test, and so forth. Graphics layer handling module 216 may be configured to write video mask layer compositing commands 230 into compositor graphics command buffer 208 to blend video masks onto on screen surface 130. Video handling module 218 may be configured to write video layer compositing commands 232 into compositor graphics command buffer 208 to blend video layer onto on screen surface 130. The various handling modules 212-218 may selectively communicate with each other directly, e.g., by passing data and/or pointers to each other, or indirectly, e.g., via data structures.

Once assembled, the various commands 222-230 may be flushed by graphics driver 106 to graphics hardware 112 to render on screen surface 130 onto display device 114.

Figure 3:
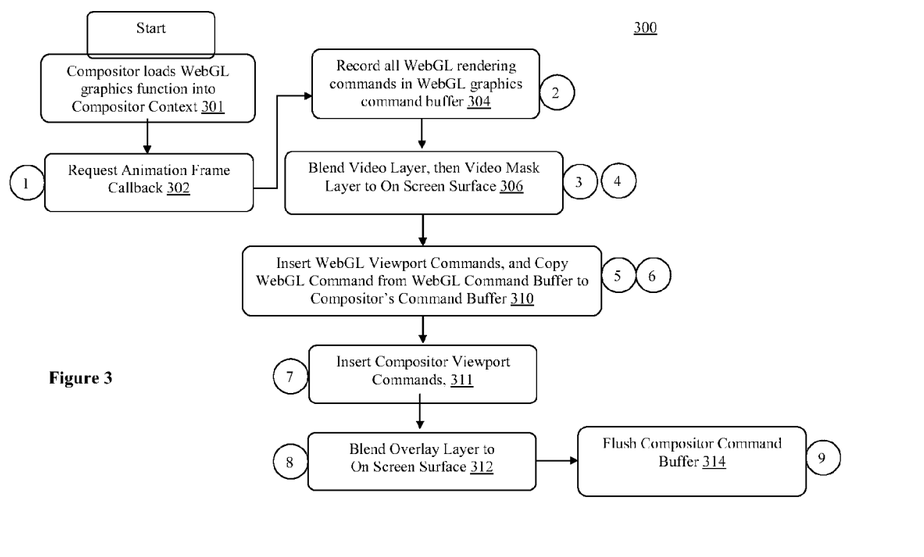
FIG. 3 illustrates an example process for supporting web applications with rich media, in accordance with various embodiments.

Referring now also to FIG. 3, which illustrates an example process for supporting web applications with rich media, in accordance with various embodiments. For ease of understanding, the various operation blocks of process 300, blocks 302-314, are also labeled respectively with circular annotations, each with a number inside, circular annotations 1-9, to map/associate the various operation blocks of FIG. 3 with the control and data paths of FIG. 2. As shown, in embodiments, process 300 may start at block 301. At block 301, WebGL function 202 may be loaded into the execution context of compositor, e.g., by compositor 206. In alternate embodiments, WebGL function 202 may be loaded into the execution context of compositor by a loader or scheduler of the operating system of computing device 100. From block 301, process may proceed to block 302. At block 302, a web application with WebGL functions 202 may be requested for animation frame callback, e.g., by compositor 206. From block 302, process 300 may proceed to block 304. At block 304, in the course of execution, WebGL commands may be stored into graphics command buffer 204, e.g., by WebGL functions 202.

From block 304, process 300 may proceed to block 306. At block 306, video layer compositing commands 232 may be written into compositor graphics command buffer 208 to blend video layer onto on screen surface 130, e.g., by video handling module 218.

Further, at block 306, video mask layer compositing commands 230 may be written into compositor graphics command buffer 208 to blend video masks onto on screen surface 130, e.g., by graphics layer handling module 216.

From block 306, process 300 may proceed to block 310. At block 310, the WebGL viewport commands 228 may be inserted into compositor graphics command buffer 208, e.g., by rendering state management module 215 to control where graphics of WebGL functions 202 would be blended. Thereafter, WebGL rendering commands 226 may be copied from graphics command buffer 204, into compositor command buffer 208, to blend WebGL layer onto on screen surface 130, e.g., by WebGL layer handling module 214.

From block 310, process 300 may proceed to block 311. At block 311, viewport commands of the compositor 224 may be inserted into compositor command buffer 208, e.g., by rendering state management module 215, to coordinate the blending of the graphics of WebGL functions 202 and compositor 206. From block 311, process 300 may proceed to block 312. At block 312, overlay graphics layer compositing commands 222 may be written into compositor graphics command buffer 208 to blend overlay layer onto on screen surface 130, e.g., by CSS layer handling module 212.

From block 312, process 300 may proceed to block 314. At block 314, the various compositing commands 222-232 may be flushed from compositor graphics command buffer 208, e.g., by graphics driver 106, to graphics hardware 112, to render on screen surface 130 on display device 114.

Figure 4:
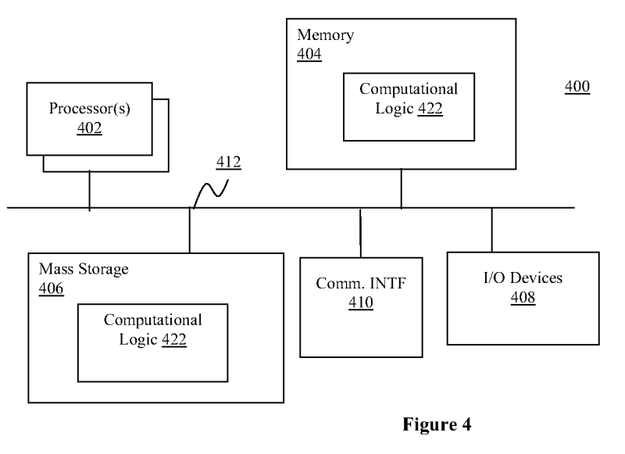
FIG. 4 illustrates an example computing environment suitable for practicing the disclosure, in accordance with various embodiments.

Referring now to FIG. 4, wherein an example computer suitable for use for the arrangement of FIG. 1, in accordance with various embodiments, is illustrated. As shown, computer 400 may include one or more processors or processor cores 402, and system memory 404. For the purpose of this application, including the claims, the terms "processor" and "processor cores" may be considered synonymous, unless the context clearly requires otherwise. Additionally, computer 400 may include mass storage devices 406 (such as diskette, hard drive, compact disc read only memory (CD-ROM) and so forth), input/output devices 408 (such as display, keyboard, cursor control and so forth) and communication interfaces 410 (such as network interface cards, modems and so forth). The elements may be coupled to each other via system bus 412, which may represent one or more buses. In the case of multiple buses, they may be bridged by one or more bus bridges (not shown).

Each of these elements may perform its conventional functions known in the art. In particular, system memory 404 and mass storage devices 406 may be employed to store a working copy and a permanent copy of the programming instructions implementing the operations associated with graphics functions 124/202 and compositor 126/206, earlier described. The various elements may be implemented by assembler instructions supported by processor(s) 402 or high-level languages, such as, for example, C, that can be compiled into such instructions.

The permanent copy of the programming instructions may be placed into permanent storage devices 406 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

The number, capability and/or capacity of these elements 410-412 may vary, depending on the intended use of example computer 400, e.g., whether example computer 400 is a stationary computing device like a set-top box or a desktop computer, or a mobile computing device, like a smartphone, tablet, ultabook or laptop. The constitutions of these elements 410-412 are otherwise known, and accordingly will not be further described.

Figure 5:
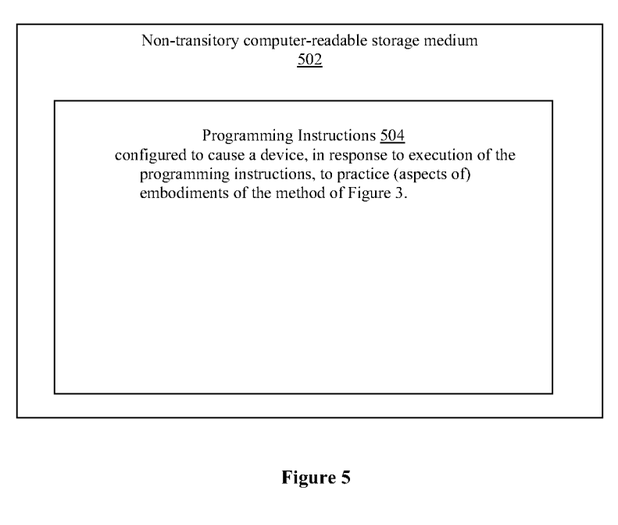
FIG. 5 illustrates an example storage medium with instructions configured to enable an apparatus to practice the present disclosure, in accordance with various embodiments.

FIG. 5 illustrates an example non-transitory computer-readable storage medium having instructions configured to practice all or selected ones of the operations associated with graphics functions 124/202 and compositor 126/206, earlier described; in accordance with various embodiments. As illustrated, non-transitory computer-readable storage medium 502 may include a number of programming instructions 504. Programming instructions 504 may be configured to enable a device, e.g., computer 400, in response to execution of the programming instructions, to perform, e.g., various operations of process 300 of FIG. 3, e.g., but not limited to, the operations performed in association with enhancing the performance of graphic operations in support of graphics applications with rich graphics. In alternate embodiments, programming instructions 504 may be disposed on multiple non-transitory computer-readable storage media 502 instead.

Referring back to FIG. 4, for one embodiment, at least one of processors 402 may be packaged together with computational logic 422 (in lieu of storing in memory 404 and/or mass storage 406) configured to practice aspects of the process of FIG. 3. For one embodiment, at least one of processors 402 may be packaged together with computational logic 422 configured to practice aspects of the process of FIG. 3 to form a System in Package (SiP). For one embodiment, at least one of processors 402 may be integrated on the same die with computational logic 422 configured to practice aspects of the process of FIG. 3. For one embodiment, at least one of processors 402 may be packaged together with computational logic 422 configured to practice aspects of the process of FIG. 3 to form a System on Chip (SoC). For at least one embodiment, the SoC may be utilized in, e.g., but not limited to, a computing tablet.

Thus, example embodiments described include, but are not limited to:

Example 1, which is an apparatus for operating graphics applications. The apparatus may include a general purpose processor; a graphics processor to complement the general purpose processor; first memory coupled with the general purpose processor, and configured to hold a graphics commands buffer; and second memory coupled with the graphics processor, and configured to hold a compositor command buffer. The apparatus may further include a compositor, associated with the compositor command buffer, and configured to be operated by the general purpose processor in an execution context. The compositor may include a rendering state management module configured to insert a plurality of viewport commands associated with a plurality of graphics functions into the compositor command buffer, wherein the graphics functions are associated with a graphics application operated by the general purpose processor, and are loaded to operate in the execution context of the compositor, and a graphics library command handling module configured to copy a plurality of graphics commands of the graphics functions, from the graphics command buffer to the compositor command buffer, to be subsequently provided to the graphics processor.

Example 2, which includes the subject matter of example 1, and wherein the general purpose processor comprises a plurality of processor cores.

Example 3, which includes the subject matter of example 1, and a display device coupled with the graphics processor, and a graphics driver configured to operate an on screen surface to be rendered on the display device by the graphics processor, wherein the context of the compositor, within which the graphics functions are operated, is bounded to the on screen surface.

Example 4, which includes the subject matter of example 3, wherein the compositor further comprises a video layer handling module configured to blend a video layer onto the on screen surface.

Example 5, which includes the subject matter of example 3, wherein the compositor further comprises a video mask handling module configured to blend a video mask layer onto the on screen surface.

Example 6, which includes the subject matter of example 3, wherein the compositor further comprises an overlay layer module configured to blend an overlay layer onto the on screen surface.

Example 7, which includes the subject matter of example 3, wherein the compositor is further configured to load the graphics function into the execution context of the compositor, or request the graphics application for animation frame callback.

Example 8, which includes the subject matter of example 1, and a browser, wherein the browser comprises the compositor.

Example 9, which includes the subject matter of any one of examples 1-8, wherein the graphics application is a web application, and the graphics functions are Web Graphics Library functions.

Example 10, which includes the subject matter of example 9, wherein the apparatus is a selected one of a set-top box, a smartphone, a computing tablet, an ultrabook, a laptop computer, or a desktop computer.

Example 11 is a method for operating graphics application. The method may include requesting, by a compositor operating in an execution context on a computing device, animation frame callback, from a graphics application operating on the computing device, the graphics application having a plurality of graphics functions operating in the execution context of the compositor, and storing, by the graphics functions while operating in the execution context of the compositor, a plurality of graphics commands into a graphics command buffer. The method may further include blending, by the compositor, video layer into a compositor command buffer; and blending, by the compositor, video mask layer into the compositor command buffer. The method may further include inserting, by the compositor, a plurality of viewport commands associated with the graphics functions into the compositor command buffer; and copying, by the compositor, the graphics commands from the temporary graphics command buffer to the compositor command buffer.

Example 12, which includes the subject matter of example 11, and inserting viewport commands of the compositor, by the compositor into the compositor command buffer; and blending, by the compositor, overlay graphics layer into the compositor command buffer.

Example 13, which includes the subject matter of example 12, and flushing, by a graphics driver, content of the compositor command buffer to render the on screen surface on a display device of the computing device.

Example 14, which includes the subject matter of example 11, and loading, by the compositor, the graphics functions into the execution context Example 15, which includes the subject matter of any one of examples 11-14, wherein the graphics application is a web application, and the graphics functions are Web Graphics Library functions.

Example 16 is an apparatus for operating web applications. The apparatus may include means for executing a web application, means for executing graphics commands of graphics functions of the web application, and means for hosting a graphics commands buffer, and a compositor command buffer. The apparatus may further include a compositor for inserting a plurality of viewport commands associated with the graphics functions into the compositor command buffer, and copying a plurality of graphics commands of the graphics functions, from the graphics command buffer to the compositor command buffer. The compositor and the graphic functions are all operated in a common shared execution context.

Example 17, which includes the subject matter of example 16, and means for operating an on screen surface bounded to the execution context of the compositor.

Example 18, which includes the subject matter of example 17, and wherein the compositor is further for blending a video layer to the on screen surface.

Example 19, which includes the subject matter of example 17, and wherein the compositor is further for blending a video mask layer to the on screen surface.

Example 20, which includes the subject matter of example 17, and wherein the compositor is further for blending an overlay layer to the on screen surface.

Example 21, which includes the subject matter of example 16, and wherein the compositor is further configured to insert viewport command of the compositor into the compositor command buffer.

Example 22, which includes the subject matter of any one of examples 16-21, wherein the graphics functions are Web Graphics Library functions.

Example 23 is one or more storage medium comprising a plurality of instructions configured to cause a computing device, in response to execution of the instructions by the computing device, to perform a number of graphics processing operations. The operations may include an insertion operation, wherein a compositor of the computing device inserts a plurality of viewport commands associated with a plurality of graphics functions into a compositor command buffer associated with the compositor, wherein the graphics functions are associated with a graphics application of the computing device; and a copy operation, wherein the compositor copies a plurality of graphics commands of the graphics functions, from a graphics command buffer to the compositor command buffer. The compositor and the graphic functions are all operated in a common shared context.

Example 24, which includes the subject matter of example 23, wherein the execution context is bounded to an on screen surface to be rendered on a display of the computing device.

Example 25, which includes the subject matter of example 24, wherein the operations further comprises a blend operation, wherein the compositor blends a video layer to the on screen surface.

Example 26, which includes the subject matter of example 24, wherein the operations further comprises a blend operation, wherein the compositor blends a video mask layer to the on screen surface.

Example 27, which includes the subject matter of example 24, wherein the operations further comprises a blend operation, wherein the compositor blends an overlay layer to the on screen surface.

Example 28, which includes the subject matter of example 23, wherein the operations further comprises another insertion operation, wherein the compositor inserts viewport commands of the compositor into the compositor command buffer.

Example 29, which includes the subject matter of example 23, wherein the operations further comprises a request operation, wherein the compositor requests the graphics application for animation frame callback, or a load operation, wherein the compositor loads the graphics functions into the execution context of the compositor.

Example 30, which includes the subject matter of example 23, wherein the compositor is part of a browser of the computing device.

Example 31, which includes the subject matter of any one of examples 23-30, wherein the graphics application is a web application, and the graphics functions are Web Graphics Library functions.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for operating graphics applications, comprising:
    a general purpose processor;
    a graphics processor to complement the general purpose processor;
    first dedicated memory coupled with the general purpose processor to hold a graphics command buffer for an execution context of a compositor of a browser;
    second dedicated memory coupled with the graphics processor to hold a compositor command buffer for the execution context of the compositor of the browser; a display device; and
    the browser, having the compositor, to be operated by the general purpose processor;
    wherein the browser is to support a graphics application, having a plurality of Web Graphics Library (WebGL) graphics functions, to be operated by the general processor in the execution context of the compositor, and the WebGL graphic functions, in lieu of drawing graphics onto an off screen surface, are to write graphic commands for drawing the graphics into the graphics command buffer;
    wherein the compositor is to compose on screen displays as commanded by hypertext markup language (HTML) elements of the graphics application in an on screen surface to be rendered on the display device, wherein the execution context is bounded to the on screen surface, and
    wherein the compositor includes:
    a rendering state management module to first insert a plurality of viewport commands associated with the plurality of WebGL graphics functions into the compositor command buffer; and
    a graphics library command handling module to copy a plurality of graphics commands of the WebGL graphics functions, from the graphics command buffer to the compositor command buffer, after the viewport commands have been first inserted into the compositor command buffer, wherein the copied graphics commands are subsequently provided from the compositor command buffer to the graphics processor to draw the graphics onto the on screen surface.

2. The apparatus of claim 1, wherein the general purpose processor comprises a plurality of processor cores.

3. The apparatus of claim 1, further comprising a graphics driver to operate the on screen surface to be rendered on the display device by the graphics processor.

4. The apparatus of claim 3, wherein the compositor further comprises a video layer handling module to blend a video layer onto the on screen surface, a video mask handling module to blend a video mask layer onto the on screen surface, or an overlay layer module to blend an overlay layer onto the on screen surface.

5. The apparatus of claim 3, wherein the compositor is further to load the WebGL graphics function into the execution context of the compositor, or request the graphics application for animation frame callback.

6. The apparatus of claim 1, wherein the apparatus is a selected one of a set-top box, a smartphone, a computing tablet, an ultrabook, a laptop computer, or a desktop computer.

7. A method for operating a graphics application, comprising: requesting, by a compositor of a browser, operating in an execution context on a computing device, animation frame callback, from a graphics application operating on the computing device, the graphics application having a plurality of Web Graphics Library (WebGL) graphics functions operating in the execution context of the compositor;
writing, by the WebGL graphics functions while operating in the execution context of the compositor, a plurality of graphics commands into a graphics command buffer disposed in the execution context of the compositor, the graphics commands being for drawing graphics, in lieu of drawing the graphics onto an off screen surface, and the graphics command buffer being located in first dedicated memory of the computing device;
composing, by the compositor, on screen displays as commanded by hypertext markup language (HTML) elements of the graphics application in an on screen surface, the execution context being bounded to the on screen surface;
blending, by the compositor, a video layer into a compositor command buffer in the execution context, the compositor command buffer being located in second dedicated memory of the computing device;
blending, by the compositor, a video mask layer into the compositor command buffer;
inserting, by the compositor, a plurality of viewport commands associated with the WebGL graphics functions into the compositor command buffer; and
copying, by the compositor, after the inserting, the graphics commands from the graphics command buffer to the compositor command buffer;
wherein the copied graphics commands are subsequently provided from the compositor command buffer to a graphics processor to render onto the on screen surface, which in turn is displayed onto a display device of the computing device.

8. The method of claim 7, further comprising inserting viewport commands of the compositor, by the compositor into the compositor command buffer; and blending, by the compositor, an overlay graphics layer into the compositor command buffer.

9. The method of claim 8, further comprising flushing, by a graphics driver, content of the compositor command buffer to render the on screen surface on a display device of the computing device.

10. The method of claim 7, further comprising loading, by the compositor, the WebGL graphics functions into the execution context.

11. At least one storage medium comprising a plurality of instructions to cause a computing device, in response to execution of the instructions by the computing device, to perform a number of graphics processing operations, including an insertion operation,
wherein a compositor of the computing device inserts a plurality of viewport commands associated with a plurality of Web Graphics Library (WebGL) graphics functions into a compositor command buffer in an execution context of the compositor,
wherein the compositor command buffer is located in first dedicated memory of the computing device, the WebGL graphics functions are associated with a graphics application of the computing device, executed in the execution context of the compositor, and writes graphics commands to draw graphics, in lieu of an off screen surface, into a graphics command buffer in the execution context of the compositor, and the graphics command buffer is located in second dedicated memory of the computing device; and
a copy operation, wherein the compositor copies a plurality of graphics commands of the WebGL graphics functions, after the insertion operation, from the graphics command buffer to the compositor command buffer; and
wherein the copied graphics commands are subsequently provided from the compositor command buffer to a graphics processor to render onto an on screen surface, which in turn is displayed onto a display device of the computing device;
wherein the compositor composes on screen displays as commanded by hypertext markup language (HTML) elements of the graphics application in the on screen surface, and the execution context of the compositor is bounded to the on screen surface.

12. The at least one storage medium of claim 11, wherein the operations further comprise a blend operation, wherein the compositor blends a video layer, a video mask layer or an overlay layer to the on screen surface.

13. The at least one storage medium of claim 11, wherein the operations further comprise another insertion operation, wherein the compositor inserts viewport commands of the compositor into the compositor command buffer.

14. The at least one storage medium of claim 11, wherein the operations further comprise a request operation, wherein the compositor requests the graphics application for animation frame callback, or a load operation, wherein the compositor loads the WebGL graphics functions into the execution context of the compositor.

* * * * *